United States Patent
Briscoe et al.

(10) Patent No.: US 9,084,132 B2
(45) Date of Patent: Jul. 14, 2015

(54) MONITORING PATH CHARACTERISATION INFORMATION

(75) Inventors: Robert John Briscoe, London (GB); Arnaud Jacquet, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 171 days.

(21) Appl. No.: 13/704,803

(22) PCT Filed: Jun. 14, 2011

(86) PCT No.: PCT/GB2011/000893
§ 371 (c)(1),
(2), (4) Date: Dec. 17, 2012

(87) PCT Pub. No.: WO2011/157984
PCT Pub. Date: Dec. 22, 2011

(65) Prior Publication Data
US 2013/0088997 A1    Apr. 11, 2013

(30) Foreign Application Priority Data
Jun. 17, 2010   (EP) .................................. 10251106

(51) Int. Cl.
*H04W 24/02*    (2009.01)
*H04L 12/801*   (2013.01)
(Continued)

(52) U.S. Cl.
CPC .............. *H04W 24/02* (2013.01); *H04L 47/10* (2013.01); *H04L 47/24* (2013.01); *H04L 47/26* (2013.01);
(Continued)

(58) Field of Classification Search
CPC ....... H04L 47/10; H04L 47/24; H04L 47/283; H04L 47/286; H04L 47/32; H04L 47/326; H04L 47/26; H04L 43/0864; H04L 43/087; H04W 24/02
See application file for complete search history.

(56) References Cited

U.S. PATENT DOCUMENTS

2007/0047446 A1*   3/2007   Dalal et al. .................... 370/237

FOREIGN PATENT DOCUMENTS

| EP | 2 106 068 | 9/2009 | |
| GB | WO 2009/090387 | * 7/2009 | .............. H04L 12/56 |

(Continued)

OTHER PUBLICATIONS
International Search Report for PCT/GB2011/000893, mailed Aug. 22, 2011.
(Continued)

*Primary Examiner* — Jae Y Lee
(74) *Attorney, Agent, or Firm* — Nixon & Vanderhye P.C.

(57) ABSTRACT

Methods and an associated traffic management module and system are disclosed for monitoring, at a traffic management module (26) within a data network, path characterisation information indicative of at least one measure of a dynamic network characteristic at a remote node (23) outside said data network. The method involves a traffic management module (26) receiving at least one data unit from a remote node (23) outside said data network, and in the event that said at least one data unit is encapsulated in an outer header and that an inner header of said data unit includes path characterisation information, performing the following in respect of said data unit: (a) monitoring said path characterisation information in said inner header; and (b) forwarding said data unit according to a first treatment category. In the event that these conditions are not met, the data unit is instead subjected to an alternative treatment.

17 Claims, 3 Drawing Sheets

(51) Int. Cl.
*H04L 12/851* (2013.01)
*H04L 12/825* (2013.01)
*H04L 12/841* (2013.01)
*H04L 12/823* (2013.01)
*H04L 12/26* (2006.01)

(52) U.S. Cl.
CPC ............ *H04L 47/283* (2013.01); *H04L 47/286* (2013.01); *H04L 47/32* (2013.01); *H04L 47/326* (2013.01); *H04L 43/087* (2013.01); *H04L 43/0864* (2013.01)

(56) References Cited

FOREIGN PATENT DOCUMENTS

| GB | 2106068 | * | 9/2009 | ............. H04L 12/26 |
| GB | WO 2009/118540 | * | 10/2009 | ............. H04L 12/56 |

OTHER PUBLICATIONS

Written Opinion of the International Searching Authority for PCT/GB2011/000893, mailed Aug. 22, 2011.

EP Search Report for EP Application No. 10 25 1106, dated Nov. 12, 2010.

Briscoe, "Tunnelling of Explicit Congestion Notification; draft-ietf-tsvwg-ecn-tunnel-08.txt", Tunnelling of Explicit Congestion Notification; No. 8, (Mar. 3, 2010), pp. 1-43.

Ramakrishnan et al., "ECN Interactions with IP Tunnels; draft-floyd-ecn-tunnels-01.txt", IETF Standard-working-Draft, No. 1, (Oct. 1, 2000).

* cited by examiner

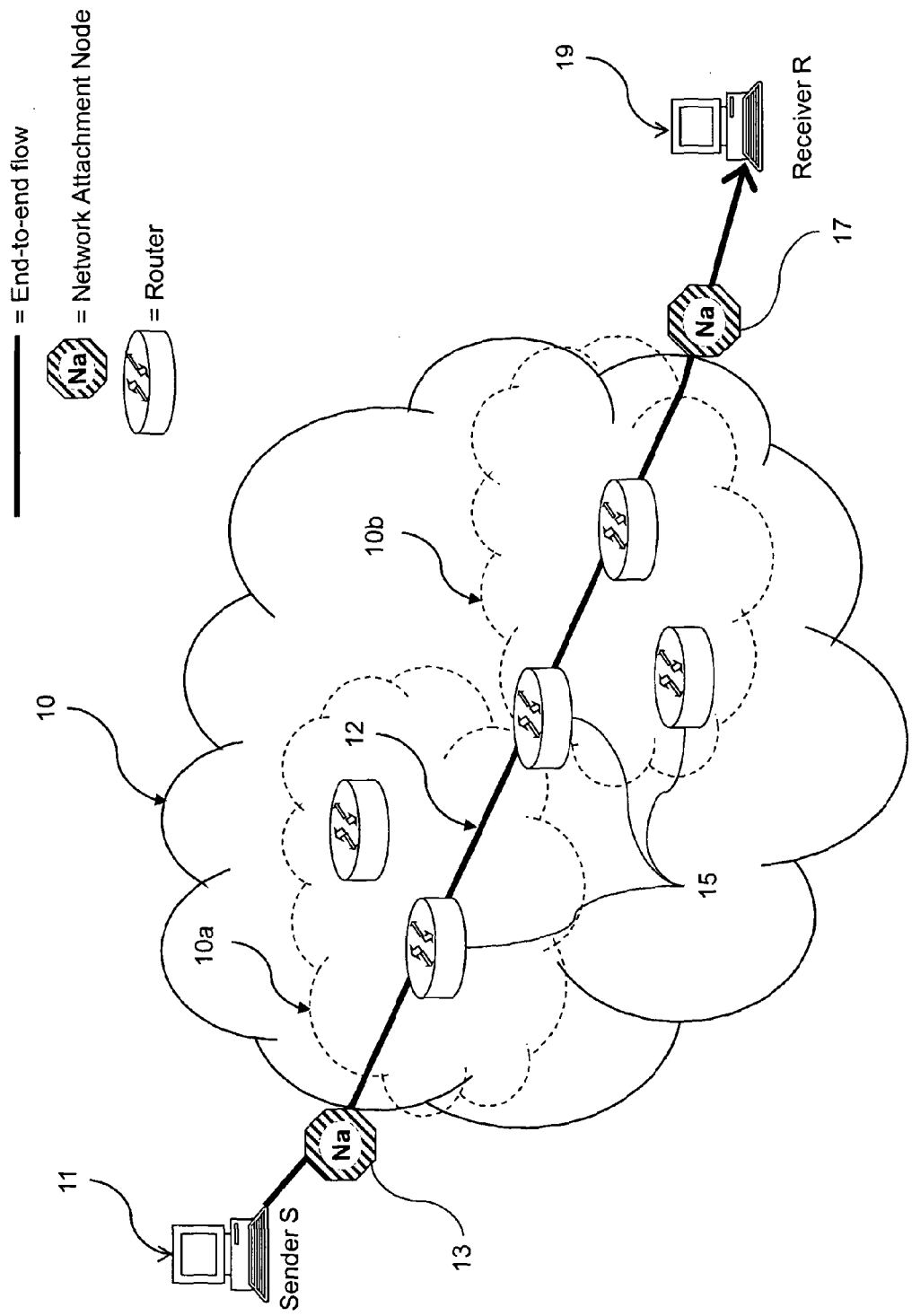
Figure 1 - Schematic of typical network

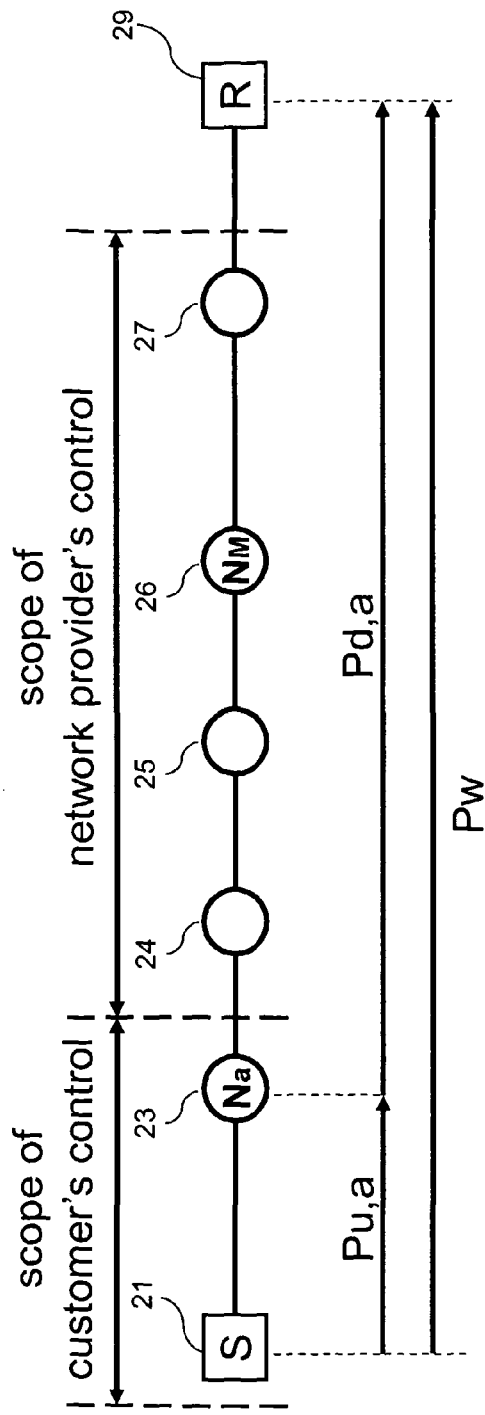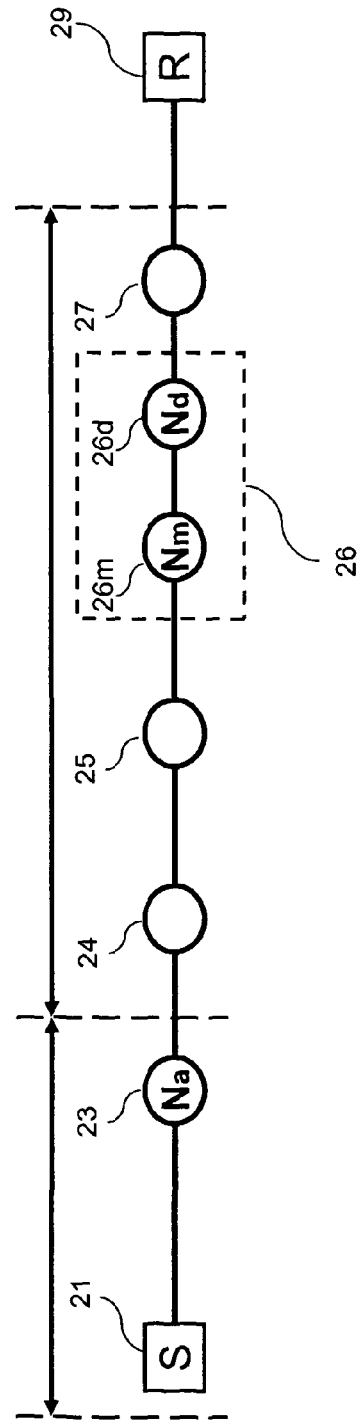
Figure 2(a)
Figure 2(b)

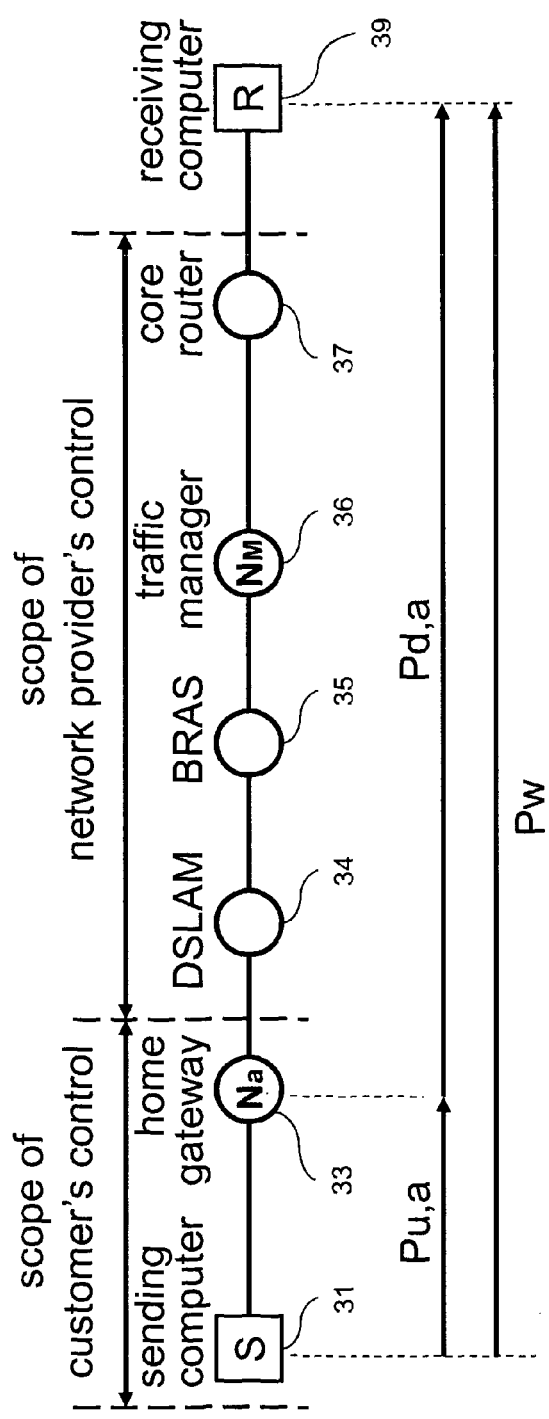
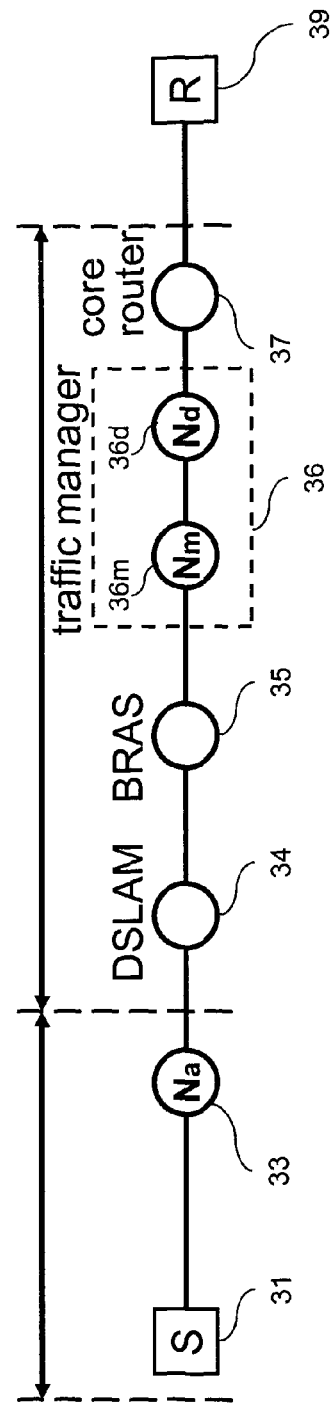
Figure 3(a)
Figure 3(b)

MONITORING PATH CHARACTERISATION INFORMATION

This application is the U.S. national phase of International Application No. PCT/GB2011/000893, filed 14 Jun. 2011, which designated the U.S. and claims priority to EP Application No. 10251106.0, filed 17 Jun. 2010, the entire contents of each of which are hereby incorporated by reference.

TECHNICAL FIELD

The present invention relates to methods, devices and systems for monitoring path characterisation information. In particular, embodiments of the present invention relate to methods, devices and systems for monitoring or enabling monitoring, by a traffic management module located within a data network, of path characterisation information indicative of at least one measure of a dynamic network characteristic at a remote location outside said data network.

BACKGROUND TO THE INVENTION AND PRIOR ART

We start by presenting some basic concepts to facilitate the understanding of the mechanisms that are presented further on.

Packets

Data sources typically split the data they send into small units known as packets. A packet consists of a header and a payload. The great majority of packets carried by commercial networks nowadays are so-called Internet protocol (IP) packets, which means they comply to the format specified in IETF RFC 791 (J. Postel: "Internet Protocol", Internet Engineering Task Force STD 5, September 1981) as updated by various subsequent amendments. IP ensures the packets are correctly transmitted from the source to the destination. IP is a connectionless protocol—that means each packet carries sufficient information for any IP router to be able to forward it towards its destination without having had to previously set up any per-connection state in the router. Each packet could take a different route to reach the destination. In practice the routing mechanisms on the Internet mean that this seldom happens (unless there is some form of equipment failure).

Encapsulation and Tunnelling

It is common for the payload of each packet to contain or encapsulate a number of further headers that are defined by various communication protocols. When a packet reaches the destination computer specified in its IP header, the destination strips off the IP header and uses the next header to determine which process within the computer should handle the resulting payload. Further headers encapsulated within that might tell the receiving process 30 which session the packet belongs to and other information, such as what the source computer is asking the destination computer to do.

Packet networks invariably use this technique called header encapsulation to wrap the packet itself within a further header called a frame header. For instance, in order to transmit an IP packet to a router at the other end of an Ethernet link, the IP packet is encapsulated within an Ethernet header addressed to the router. This is further discussed in RFC1042 (J. Postel & J. Reynolds: "A Standard for the Transmission of IP Datagrams over IEEE 802 Networks", Internet Engineering Task Force Request for comments 1042, February 1988). This means an Ethernet header is pre-pended to the IP packet and some further Ethernet information is added to the end of the packet. In general, encapsulation may only involve pre-pending without post-pending. When the destination router addressed in the outermost Ethernet header is reached, at the end of the Ethernet segment of the path, it will recognise that the Ethernet frame is addressed to itself and decapsulate the payload of the Ethernet frame by stripping off the Ethernet header and footer. It will then inspect the IP header of the resulting packet and look up the destination IP address in its IP routing table. This routing lookup will give the router the link layer address to use to reach the next IP router and the output port to forward the packet out of in order to reach it. If, for instance, this output port uses Multiprotocol Label Switching (MPLS) technology, discussed further in RFC 3031 (E. Rosen, A. Viswanathan and R. Callon: "Multiprotocol Label Switching Architecture", IETF RFC3031, January 2001), the router will encapsulate the IP packet in an MPLS header, and a label will be included that the next MPLS label switched router (LSR) will use to forward the MPLS frame onwards towards subsequent LSRs.

IP packets can be encapsulated within further IP headers rather than the headers of lower layer protocols such as Ethernet or MPLS. This technique is called tunnelling, because it forces the inner IP packet to take a path via an intermediate machine with the destination IP address in the outer header. This intermediate machine strips off (decapsulates) the outer IP header and discovers another IP packet inside. It then forwards this to the destination IP address given in the new outermost header, which was previously the inner header.

Tunnelling is not confined to IP packets. It is common for Ethernet frames to contain further Ethernet frames (termed MAC in MAC) and MPLS headers often encapsulate further MPLS headers (termed a label stack).

The methods described below are equally applicable to any network technology that transmits data in packet-like or frame-like messages, whether IP, IEEE 802 (Ethernet), MPLS, or other similar technologies.

Re-Feedback

One of the functions of a packet header such as the header of an IP packet is to accumulate information about the path it traverses on its way from the sender to the receiver. For instance, the time-to-live (TTL) field is decremented at every IP node or the explicit congestion notification (ECN) field is probabilistically marked if the packet experiences congestion (see next section). This path information allows nodes on the path to monitor characteristics of the path experienbed so far (the upstream path). Mechanisms exist or have been proposed to allow the receiver to feed back this information to the sender. ECN is discussed further in RFC 3168 (K. Ramakrishnan, S. Floyd, & D. Black: "The Addition of Explicit Congestion Notification (ECN) to IP", Internet Engineering Task Force Request for comments 3168, September 2001).

International application WO 2005/096566 describes a mechanism called re-feedback, whereby the source re-inserts into the forward data path this information fed back to it by the receiver that had accumulated along the whole path. The sender may reinsert this information using a separate field in the packet header to that used to accumulate the original path metric or alternatively, it may initialise the value of the metric in the original field to a value that reflects the feedback it receives.

Re-feedback is also discussed in the article "*Policing Congestion Response in an Internetwork Using Re-Feedback*" by B. Briscoe, A. Jacquet, C. Cairano-Gilfedder, A. Salvatori, A. Soppera, & M. Koyabe (Proc. ACM SIGCOMM'05, Computer Communication Review 35(4):277-288, ACM Press, August 2005).

Any node along the path may then monitor the characteristics of the whole path at least a round trip ago. Given any node can already monitor the characteristics of the upstream path, it can subtract this from the re-inserted whole path information to calculate an expectation of the characteristics of the downstream path (the rest of the path still to be traversed by packets it forwards).

International application WO 2005/109783 describes a mechanism to detect that a source is persistently understating a characteristic of the path in a flow of packets, and sanction the flow accordingly to make it in the source's interests to comply with the required behaviour that assures the integrity of the re-inserted feedback and the original feedback.

Distributed Bandwidth Sharing and Congestion

Data traversing the Internet follows a path between a series of routers, controlled by various routing protocols. Each router seeks to move the packet closer to its final destination. If too much traffic traverses the same router in the network, the router can become congested and packets start to experience excessive delays whilst using that network path. If sources persist in sending traffic through that router it could become seriously overloaded (congested) and even drop traffic (when its buffers overflow). If sources still persist in sending traffic through this bottleneck it could force more routers to become congested, and if the phenomenon keeps spreading, that can lead to a congestion collapse for the whole Internet—which occurred regularly in the mid-1980s.

The solution to that problem has been to ensure that sources take responsibility for the rate at which they send data over the Internet by implementing congestion control mechanisms. Sources monitor feedback from the receiver of the metric that characterises path congestion in order to detect when the path their data is following is getting congested, in which case they react by reducing their throughput—while they may slowly increase their rate when there is no sign of the path becoming congested.

The typical path characterisation metrics that sources monitor are the average roundtrip time (RTT) for the data path, the variance of the roundtrip time (jitter) and the level of congestion on the path. The congestion is one of the parameters controlling the rate adaptation of a source sending data over a congested path.

The congestion level can be signalled either implicitly (through congested routers dropping packets when their buffers overflow or to protect themselves) or explicitly (through mechanisms such as explicit congestion notification—see next subsection). Currently the most common option is implicit signalling. Historically, routers would drop packets when they got completely saturated (which happens when a traffic burst cannot be accommodated in the buffer of the router)—this policy is called Droptail. Random Early Detection (RED) is an improvement where routers monitor the average queue length in their buffer and when the average queue is higher than a given threshold, the router starts to drop packets with a probability which increases with the excess length of the queue over the threshold. It is widely used in today's Internet because it allows sources to react more promptly to incipient congestion and it keeps queues from growing unnecessarily long. Sources using TCP are able to detect losses, because a packet loss causes a gap in the numbered sequence of bytes transferred. Whenever a TCP source detects a loss, it is meant to halve its data transmission rate, which alleviates the congestion on the router at the bottleneck.

RED is discussed further in the article "*Random Early Detection Gateways for Congestion Avoidance*" by S. Floyd & V. Jacobson (IEEE/ACM Transactions on Networking, Vol 1-4 (397-413) August 1993).

Explicit Congestion Notification in the Internet Protocol

Explicit Congestion Notification (ECN) further improves on RED by using a two-bit ECN field in the IP header to signal congestion. It runs the same algorithm as RED, but instead of dropping a packet, it sets its ECN field to the Congestion Experienced (CE) codepoint. The ECN standard requires the receiver to echo any congestion mark signalled in the data; for instance, a TCP receiver sets the Echo Congestion Experienced (ECE) flag in the TCP header, which the TCP source interprets as if the packet has been dropped for the purpose of its rate control. In turn the source then reacts to the congestion by halving its transmission rate and notifies the receiver of this using the Congestion Window Reduced (CWR) codepoint in the TCP header.

The four values of the two-bit ECN field in the IP header are:
  Non ECT, which signifies that the packet belongs to a flow that doesn't support ECN
  ECT(0) and ECT(1), which signify that the packet belongs to a flow that supports ECN but that upstream routers haven't had to mark the packet.
  Congestion Experienced (CE) which signals that a packet has experienced incipient congestion.

Encapsulation of Explicit Congestion Notification (ECN)

The ECN field is defined within the IP header and in the headers of some lower layer protocols, such as the MPLS shim header. Further information on this is provided in RFC5129 (Davie, Briscoe & Tay: "*Explicit Congestion Marking in MPLS*", Internet Engineering Task Force Request for comments rfc5129.txt, January 2008). Therefore when one IP header is encapsulated by another, or by a lower layer header such as the MPLS shim header, standard procedures must be followed to specify how a marking applied to the ECN field in the outer header will propagate to the inner header when it is decapsulated. Otherwise as an outer header is discarded, ECN markings in the outer header would also be discarded before they reached the ultimate destination at the address specified in the inner header. These rules are specified in RFC3168 for IP, RFC4301 for secure encapsulation of IP packets (IPsec) and RFC5129 for MPLS. Slightly modified rules are in the process of being standardised by the IETF—further information on this is available in "*Tunnelling of Explicit Congestion Notification*" by B. Briscoe (Internet Engineering Task Force Internet Draft draft-ietf-tsvwg-ecn-tunnel-08.txt, March 2010) (Work in progress), Appendix C of which describes how to measure the contribution to congestion introduced only by routers encountered between the encapsulating ingress and the decapsulating egress of a tunnel.

A document entitled "ECN Interactions with IP Tunnels" by Floyd, Ramakrishnan & Black (draft-floyd-ecn-tunnels-01.txt, October 2000) discusses how ECN should be propagated across tunnel endpoints. It also discusses various anomalous behaviours that might be introduced in a tunnel to pervert the measurement of end-to-end congestion.

Re-ECN

Re-ECN is an example of a system that utilises re-feedback to provide upstream and downstream congestion information throughout the network. It is similar to ECN but uses an extra unused bit in the packet header. This bit is combined with the two-bit ECN field to create four extra codepoints.

Re-ECN is discussed further in "*Re-ECN: Adding Accountability for Causing Congestion to TCP/IP*" by B. Briscoe, A. Jacquet, T. Moncaster & A. Smith (IETF Internet Draft draft-briscoe-tsvwg-re-ecn-tcp-08, September 2009). The current re-ECN specification is one candidate for a new standardisation activity being undertaken by the IETF. The final standard defined by the IETF may differ in detail from this proposed specification. The present embodiment is described with respect to this protocol proposal, without any intent to imply the invention is limited solely to the details of this one particular protocol proposal.

The simplest way to understand the protocol is to think of each packet as having a different colour flag (codepoint). At the start of a flow, a green flag (referred to as FNE or "feedback not established") is used to indicate that the sender does not have sufficient knowledge of the path. Green flags are also used when the sender is unsure about the current state of the path.

By default packets are marked with grey flags. If they encounter congestion during their progress through the network the ECN "congestion experienced" (CE) marking applied by the congested router will be termed a red flag. The destination will feed back a count of the number of red flags it has seen. For every red flag it is informed of, the sender should mark an equivalent number of bytes it sends in a subsequent packet or packets with a black flag. The black flag re-echoes or reinserts the congestion feedback back into the forward-travelling stream of packets, hence the name re-ECN. These black flags will not be modified once they are set by the sender. There is a small possibility that a black packet will in turn be marked red by a congested router, but the codepoints are chosen so that it is still possible to tell the packet was originally marked as black—such packets are described as coloured black-red.

At any intermediate node the upstream congestion is given by the proportion of red flagged bytes to total bytes. Thus the continually varying congestion level is effectively encoded in a stream of packets by interpreting the stream of red or non-red markings as a unary encoding of ones or zeroes respectively. Similarly, the congestion level of the whole path is encoded as a stream of black or non-black markings in the IP header. The expected downstream congestion from an intermediate IP-aware node can then be estimated from the difference between the respective proportions of black and red markings, as described in International application WO2006/079845.

If IP packets with red and black re-ECN markings have been encapsulated by an additional outer header or headers, further red ECN markings may be applied to the outer header. When this outer header or headers is or are removed, any red markings will be propagated to the forwarded packet by standard decapsulation techniques. During the process of encapsulation, the black markings in the inner header remain unchanged. Therefore, once an original inner IP packet has been decapsulated, the proportions of black and red markings can be measured and compared, even if the red markings were added while the packet was encapsulated.

Discussion of Prior Art/Known Techniques

It has been discussed how re-feedback can be used to measure any general characteristic of both the upstream and downstream paths of data packets passing through a node in a data network. Thus an intermediate node can establish a characteristic property of all three of: i) the path so far experienced; ii) the whole path; and iii) the rest of the path still to be experienced.

It has also been discussed how measurements of these three aspects of a path can be made for the specific case of congestion, using the specific instantiation of re-feedback referred to above and elsewhere as re-ECN.

Further, various ways to measure the contribution to specific path metrics introduced only by the nodes encountered between the encapsulating ingress and the decapsulating egress of a tunnel have been described. For instance, the article "*Tunnelling of Congestion Notification*" discussed above indicates that it is possible to measure the contribution to congestion introduced only by the routers encountered between the encapsulating ingress and the decapsulating egress of a tunnel. This technique generalises to any form of encapsulation, such as IP in MPLS (RFC5129), not just IP in IP.

Similarly, it is possible for the egress node of a tunnel to measure the number of forwarding hops experienced by a tunnelled packet by comparing the time to live (TTL) field of the outer header with that of the inner.

SUMMARY OF THE INVENTION

Data units are sent and received by devices operated by users. A user may act alone, or as part of a group of users, for example a household, a University, a business enterprise or a department. A lone user can be considered as a special case of a user-group: a user-group of one.

A network provider will often maintain a profile of the usage of a user-group. In general, the purpose of monitoring on a data-unit-by-data-unit basis is to accumulate information for storage in the usage profile of the user-group associated with each data unit. In turn, the purpose of maintaining usage profiles might be to count whether a user-group has exceeded a usage threshold, or to determine whether their usage matches an agreed profile.

In turn, profile information might be used to directly affect the network service available to the user-group. For instance, after having exceeded a usage threshold, the network might serve traffic from that user-group with lower priority. Alternatively, profile information might be used to affect the network service indirectly, for instance the amount of usage in the profile could set the level of a charge to each user-group for their network usage, which would be likely to curtail their usage relative to if they were not charged.

The network provider will typically assign a group identifier to each user-group and employ a means to associate each data unit with the appropriate group-identifier. The network provider may associate data units with their group identifier dependent on the physical cable over which each data unit enters the network, the source address given in each data unit, or cryptographic identifiers in each data unit that can only be correctly generated by members of the user-group.

A network provider A can itself be considered as a special case of a user-group with respect to another neighbouring network provider B. Those users (or networks) connected to network A are the members of the user-group of A's network, and B's network can associate all traffic forwarded to it by A's network with the user-group identifier it assigns to A's network.

A problem with known techniques is that one network generally cannot ensure that any data it receives from other networks outside of its control will allow it to perform appropriate monitoring in order to maintain a complete usage profile in an appropriate form in respect of each other network. The present inventors have realised however that a network can treat data it receives from other such networks in such a way as to provide an incentive for such other networks to provide data in a form that will enable this.

According to a first aspect of the present invention, there is provided a method of monitoring, at a traffic management module within a data network, path characterisation information indicative of at least one measure of a dynamic network characteristic at a remote node outside said data network, the method comprising said traffic management module:

receiving at least one data unit from a remote node outside said data network;

in the event that said at least one data unit is encapsulated in an outer header and that an inner header of said data unit includes path characterisation information, performing the following in respect of said data unit:

monitoring said path characterisation information in said inner header; and forwarding said data unit according to a first treatment category; and otherwise subjecting said data unit to alternative treatment to being forwarded according to said first treatment category.

As will be explained below, embodiments of the invention allow network operators to perform monitoring—at one or more traffic management modules within their data network—in such a way that the result of the monitoring operation itself serves to incentivise parties sending data units into the network to provide those data units in a form that allows the network operator to obtain the path characterisation information it requires in the manner it wishes to obtain it (i.e. in a centralised manner, or at least without needing to perform monitoring at each and every "attachment point" via which data units may be received from other networks).

While the manner in which "correctly encapsulated" data units are forwarded, and the alternative treatment to which other data items are "otherwise" subjected, may vary according to different embodiments of the invention, it will be noted that the fact that a disparity exists between the respective treatments results in an incentive being provided to parties controlling those remote nodes that send data units into the network (and wishing for them to be forwarded on to an intended destination) to ensure that their data units are sent into the network in a manner that complies with the requirements of the receiving network (i.e. that they are correctly encapsulated, and therefore carry path characterisation information in an inner header that can be taken by the receiving network to be indicative of a characteristic as it stood at the point at which the data units were encapsulated). As long as senders are suitably incentivised, this in turn allows the operator of the receiving network to perform appropriate monitoring and/or traffic management in a centralised manner, rather than having to perform monitoring and/or traffic management at each "attachment point" via which data units may be received from other networks.

In general, of course, the manner in which "correctly encapsulated" data units are forwarded should be optimised in comparison with (i.e. "better" than, at least in some way) the alternative treatment. There are however many ways in which this "preferential treatment" can be provided in such a way as to provide an appropriate incentive. The differentiation between the "preferential treatment" and the "alternative treatment", done on a "data-unit-by-data unit basis, is used principally in order to provide an appropriate incentive (with a corresponding deterrent) to parties sending data units into the network to send those data units into the network in a manner that enables a traffic management module in the network itself to perform the monitoring necessary to enable it to provide different levels of service or classes of service, or take further action, on a remote-node-by-remote-node (and possibly, therefore, a sender-by-sender basis).

Various different disparities in the way individual data items are treated (i.e. in dependence on whether they meet the "condition" of being encapsulated in an outer header and having an inner header which includes path characterisation information) may be used to create an appropriate distinction between individual data units being "forwarding according to a first treatment category" and "treated otherwise", such as one or more of the following:

forwarding data units according to the first treatment category may comprise forwarding those data units on a path towards an intended data receiver, whereas the alternative treatment may comprise not forwarding those data units on a path towards an intended data receiver at all; or forwarding data units according to the first treatment category may comprise forwarding those data units without imposing a delay, whereas the alternative treatment may comprise forwarding those data units after imposing a predetermined or variable delay; or forwarding data units according to the first treatment category may comprise forwarding those data units without an associated mark, whereas the alternative treatment may comprise forwarding those data units with an associated mark; or forwarding data units according to the first treatment category may comprise forwarding those data units on a particular (e.g. "direct") path towards an intended data receiver, whereas the alternative treatment may comprise forwarding those data units on a different path towards an intended data receiver (e.g. via a separate policing or sanctioning node).

Other possible distinctions may involve disparities such as whether the data units are forwarded unreported or reported, (to a separate policing or sanctioning node, for example).

The network characteristic may relate to a measure of network congestion, In particular, it may relate to a measure of congestion on the path in question, for example. In particular, the network characteristic may be the congestion experienced by data units as they traverse paths from respective data senders to respective data receivers.

It will be understood however that specific embodiments of the invention may be applicable in relation to monitoring path characterising information indicative of a variety of other types of network characteristics as well, which need not be congestion metrics. The network characteristic may relate to a measure of time spent traversing a path by a data unit, or a measure of the number of hops taken to traverse a path by a data unit, for example. Other embodiments of the invention may be applicable in relation to monitoring path characterising information indicative of network characteristics such as transmission cost or power consumption (which may be of relevance particularly in relation to limited-life battery-powered equipment), for example.

According to preferred embodiments, the path characterisation information may comprise information indicative of an upstream network characteristic, i.e. relating to a measure of the network characteristic in suit on a path from a data sender to the remote node (at which point the information may effectively be "frozen" such that it travels unchanged with the data unit at least until it reaches the traffic management module).

According to preferred embodiments, at least one header of the data units may provide end-to-end path characterisation information indicative of an end-to-end network characteristic relating to a measure of the network characteristic in suit on a path from a data sender to a data receiver. In general, such "end-to-end" information need not be "frozen" in the same manner as "upstream" information, as (by its nature) it should not change as the data unit traverses the path. It therefore need not be provided in a "frozen" header.

Having performed a method according to the first aspect, according to preferred embodiments, various different additional steps may be performed based on the results of the monitoring of the path characterisation information. For example, a level of service and/or a class of service to be provided in respect of data units received from a particular remote node may be set in dependence on the path characterisation information obtained in monitoring data units received from the remote node in question. Alternatively or additionally, policing and/or sanctioning in respect of data units received from a particular remote node may be performed or imposed in dependence on path characterisation information obtained in the monitoring of data units received from the remote node in question.

It will be understood that different types of sanction may be imposed, such as one or more of the following actions: dropping data units; delaying onward transmission of data units; levying a charge in respect of data units; assigning a sanction indication in respect of data units whereby to enable those data units to be identified for a subsequent sanctioning action; associating a mark in respect of data units in order to enable further sanction to be taken subsequently in respect thereof; or issuing a report to a policing authority in order to enable further sanction to be taken subsequently.

It will be understood that methods according to the above embodiments may be used to enable different levels/classes of service and/or different types of policing/sanctioning to be performed on a "remote-node-by-remote-node" basis in dependence on path characterisation information which has been obtained on a "data-unit-by-data-unit" basis. The remote nodes in question may be the original senders of the data units, or the node outside the network at which the data units were encapsulated before being sent into the network, for example.

According to specific embodiments, the method may further comprise decapsulating data units prior to the forwarding of those data units according to the first treatment category. The traffic management module may comprise a monitoring node operable to perform the step of monitoring path characterisation information in the inner headers of data units; and a separate decapsulation node associated therewith operable to perform the step of decapsulating said data units. Alternatively, the traffic management module may comprise a single management node operable to perform both functions.

According to preferred embodiments, the integrity of the remote path characterisation information may be assured using policing techniques such as those described in WO 2005/109783, discussed earlier. The path characterisation information may, for example, be indicative of a quantity of impairment along the path from the node that writes the information to the receiver of the data units, and this would be suspect if the quantity were to be found to have become negative by a node at any point on the path. In a system performing the method according to the first aspect, at least one test node in the system may be arranged to test whether the path characterisation information characterising the path from the test node to the receiver of the data units is indicative of a quantity of impairment that is negative and therefore suspect, for example. A negative impairment would represent an impairment that cannot be physically possible in certain cases. For instance if delay were indicated to be negative, it would imply the data unit having left before it arrived. Similarly, if congestion were indicated to be negative, it would imply a data unit having passed through a queue more quickly than if the queue had been empty.

According to a second aspect of the present invention, there is provided a traffic management module for monitoring, within a data network, path characterisation information indicative of at least one measure of a dynamic network characteristic at a remote node outside said data network, the traffic management module comprising:

an input operable to receive at least one data unit from a remote node outside said data network;

a processor operable to performing the following in respect of said at least one data unit in the event that said data unit is encapsulated in an outer header and that an inner header of said data unit includes path characterisation information:

monitor said path characterisation information in said inner header; and forward said data unit according to a first treatment category; said processor being operable to subject said data unit otherwise to alternative treatment to being forwarded according to said first treatment category.

According to a third aspect of the present invention, there is provided a system for enabling the monitoring, at a location within a data network, of path characterisation information relating to at least a portion of a path from a sender of data to a receiver of data, said path characterisation information being indicative of at least one measure of a dynamic network characteristic at a remote node outside said data network, said system comprising:

a traffic management module according to the second aspect within said data network; and at least one intermediate node within said data network and on a path between said remote node outside said data network and said traffic management module, the or each intermediate node being operable to receive data units having an outer encapsulating header and an inner path characterisation header associated therewith, and, in respect of each data unit, to update path characterisation data in the encapsulating header thereof in dependence on a locally-observed measure of said network characteristic while preserving information provided by said path characterisation header, and to forward said data unit in dependence on an intended destination address for said data unit provided by said encapsulating header.

The various options and preferred embodiments referred to above in relation to the first aspect are also applicable in relation to the second and third aspects.

Embodiments of the various aspects of the invention may be applicable in relation to any or all of the following scenarios: residential customer access, enterprise networks, neighbouring network providers, mobile customers, numerous simultaneous customer attachments, and others.

Depending on the type of network and the protocol or protocols in question (i.e. Internet Protocol, Ethernet or MPLS, etc.), the data units may be packets, frames, datagrams, or other types of data unit.

The network characteristic may be a dynamic network characteristic in the sense that its condition changes over a time period, or as the data unit to which it relates traverses the network, for example.

It will be understood that the extent of the data network may be defined with respect to the network provider (or other such entity) in control of the network. Whether a node is "within" or "outside" the network may be defined with respect to administrative, operational, organisational or other such boundaries, for example.

Motivation

Policy control of traffic involves i) measurement, ii) policy decision and iii) policy enforcement. Presently-proposed techniques at least primarily concern the measurement step.

Network providers would like to be able to control traffic as it enters their network preferably at each attachment point of a customer or neighbouring network. For instance, they may wish to limit the amount of congestion one customer contributes, because it affects other customers. Alternatively, they may wish to limit the amount of congestion caused in their network by traffic entering from a neighbouring network.

However, there are considerable economies of scale to be obtained from operating traffic management functions for large numbers (hundreds, thousands or millions) of customers centralised on a few machines, rather than located at similarly large numbers of separate customer attachment points. But for many network technologies, the links between a customer attachment point and the centralised part of the network are precisely where most of the contention problems arise. The most likely place where customers' traffic contends for limited shared resources is in the widely dispersed access or aggregation networks that bring traffic into the centralised facilities of the operator.

For instance, traffic travelling into a cable network may share the cable with multiple other customers right from the point where each customer attaches in the street. The same is true of passive optical networks, which are in the form of a converging tree of fibre optic cables that continually splice into single fibres as traffic gets closer to the core of the network. Similarly wireless networks are shared as soon as the signal leaves the mobile handset or laptop. Even though digital subscriber line (DSL) links are typically dedicated to each customer, traffic converges into single shared links at a DSL access multiplexer (DSLAM).

It would be more expensive to disperse per-customer traffic control functions to every DSLAM rather than locate them more centrally, perhaps at each broadband remote access server (BRAS) or even at a centralised traffic management box. The main reason for this is that per-customer traffic controls depend on policies that can be different for each customer, for instance depending on the contract they have chosen. Further a mobile customer may frequently shift to different attachment points or a corporate customer may employ staff who together use many attachment points simultaneously. Also policies regularly change dependent on other factors. Therefore it is more economic not to disperse policy-related functions more widely than necessary.

Preferred embodiments of the present invention allow a centralised traffic management function to i) measure what would have been viewed at each dispersed customer attachment point and combine these centrally collected measurements with centrally held per-customer policy information to ii) decide whether control action is necessary. All that is required at each dispersed attachment point is a generic tunnelling function that will always be the same, independent of any per-customer policies.

Step iii), enforcement of the policy, may still need to be applied at distributed attachment points. But in most cases any sophisticated traffic control can also be enforced centrally, with just a rudimentary enforcement function at each attachment point that can be triggered if the more sophisticated centralised control finds it is being ineffective.

BRIEF DESCRIPTION OF THE DRAWINGS

A preferred embodiment of the present invention will now be described with reference to the appended drawings, in which:

FIG. 1 shows a schematic diagram of a typical network;

FIGS. 2(a) and 2(b) illustrate the entities involved in performing methods according to embodiments of the invention in the context of a generalised network scenario; and FIGS. 3(a) and 3(b) illustrate the entities involved in performing methods according to embodiments of the invention in the context of a more specific scenario involving a home user connected to a network via a home gateway.

DESCRIPTION OF PREFERRED EMBODIMENTS OF THE INVENTION

Methods according to preferred embodiments will be described principally with reference to FIGS. 2(a), 2(b), 3(a) and 3(b).

Firstly, with reference to FIG. 1, we start by setting out the entities involved in conveying data along a path between two computers or other such user terminals, which will be referred to as a "Sender S" 11 and a "Receiver R" 19, connected via a network 10 with several intermediate routers 15. To simplify the description, the following explanation relates to a situation where Sender S is simply acting as a sender of data along an end-to-end path 12, while Receiver R is simply acting as a receiver of that data. It will be understood that both computers may in fact be performing both the sending and the receiving functions.

Sender S is connected to the network 10 through Network Attachment Node 13 and Receiver R is connected to the network through Network Attachment Node 17. Feedback data relating to data that Receiver R has received from Sender S may be provided from Receiver R to Sender S via network attachment nodes 17, 13 and intermediate nodes 15, or via alternative routes through network 10 or otherwise.

There may be a plurality of interconnected networks 10a, 10b, etc. (shown using dashed lines) between Sender S and Receiver R, possibly of different types or operated by different network providers or other entities, rather than a single, homogenous, uniformly-controlled network but, for the purposes of this description, it will generally be treated as being a single network 10. It should be noted however that if an end-to-end path passes through separate networks, which may be under the control of different network providers, each may operate according to an embodiment of the invention in its own right.

An explanation of a preferred embodiment will now be given in the context of a generalised network scenario, using FIG. 2(a), which shows a data path from sender (S) 21 to receiver (R) 29 via a network attachment node (Na) 23 and into a network, the portion of the path through the network traversing various nodes 24-27 including a traffic management module (N$_M$) 26.

Preferred embodiments make it possible for a traffic management module (N$_M$) 26 in a network to measure a characteristic of the network path as it would be seen from the viewpoint of a different, remote upstream node such as the network attachment node (Na) 23 on the same path. The traffic management module (N$_M$) 26 can therefore measure a characteristic property (such as congestion) of the path between the data source (S) 21 and the remote network attachment node (Na) 23. This measured property is denoted as "Pu,a", where the letter 'u' denotes "upstream" and the letter 'a' denotes that the measurement is as would be viewed from network attachment node (Na) 23.

In particular, it is possible for the traffic management module (N$_M$) 26 to view these path characteristics as the remote network attachment node (Na) 23 would see them, even if the operator of the traffic management module (N$_M$) 26 does not control the network attachment node (Na) 23. FIG. 2(a) shows this scenario where the network attachment node 23 is in the scope of control of a customer and outside the scope of control of the network provider who controls the traffic management module (NM) 26. Of course, it is not necessary that the two nodes are operated by different parties; alternative embodiments may be envisaged which may operate in a similar manner and in which the same party may operate both nodes (Na and NM).

In a preparatory step, the operator of the traffic management module (NM) 26 may make it a condition of its service (or a condition of a particular class or level of its service) that it will only consider packets encapsulated with an outer header addressed to traffic management module (NM) 26. During network operation the traffic management module (NM) 26 will discard or otherwise downgrade arriving packets which are not addressed to traffic management module (NM) 26 or which do not encapsulate another valid packet, which would typically be addressed to an onward destination (such as Receiver R). Thus, network attachment node (Na) 23 must encapsulate packets with an appropriate outer header if it wishes traffic management module (NM) 26 to forward them to Receiver R, at least not without degradation.

During operation, the traffic management module (NM) 26 decapsulates the outer header of the packet, but before propagating any path characteristic from the outer header into the forwarded header it records the state of any path characteristic field or fields carried in the inner header. As nodes on the path update path metrics in packets, they generally only alter the outer header, never the inner header, which would otherwise violate the reasoning behind encapsulation. Therefore the inner header effectively preserves the state of the path metrics as they were when the packet was encapsulated. In this way the traffic management module (NM) 26 at the egress of the tunnel can see the path characteristics as they were when the attachment node 23 encapsulated the packets. Thus, the traffic management module (NM) 26 can measure the characteristic experienced by the packet between the sender (S) 21 and the ingress of the tunnel (Na) 23, namely the path characteristic (Pu,a) upstream of the attachment node 23.

Preferably, the network operator may also make it a condition of service that the source (S) 21 will re-insert a certain path characteristic or characteristics into the forward stream of data packets (according to the re-feedback proposal, for example). Any node in the network (such as Na, $N_M$, or others) can thus measure these whole path characteristics (Pw) by inspecting passing packets. The network operator can ensure the sender carries out this step faithfully using a policing mechanism such as or similar to that described in either WO 2005/109783 or in the article on Re-ECN discussed earlier, for example.

The traffic management module (NM) 26 can then subtract the path characteristic (Pu,a) upstream of the attachment node from the whole path metric (Pw) to calculate the expected path characteristic (Pd,a) where the letter 'd' denotes the "downstream" characteristic between the attachment node (Na) 23 and the data receiver (R) 29. Thus the traffic management module 26 can remotely view all three path characteristics as they would be seen from the attachment node 23, namely the upstream, downstream and whole path measures of the characteristic.

Alternatively some node earlier in the path than the attachment node 23, such as the sender (S) 21 could encapsulate the packets so that the traffic management module 26 will decapsulate them correctly. Typically all nodes on a network path either leave a path metric unchanged or alter it to indicate reduced path quality (e.g. more congestion or more delay). Therefore if a node earlier in the path than the attachment node 23 encapsulated packets, the quality indicated as a function of the upstream path metric (Q(Pu,0)) in the inner header could only be greater than or equal to the quality as measured at the attachment node (i.e. Q(Pu,0)≥Q(Pu,a)). In most if not all scenarios, it is in the interests of a customer for any degradation of quality its traffic causes in its downstream path through other networks to appear to be as low as possible. Therefore it will generally be in the interests of a customer to encapsulate packets at the last possible opportunity, i.e. at the attachment node 23.

With reference briefly to FIG. 2(*b*), it should be noted that the traffic management module 26 need not be a single node (NM) 26 as is shown in FIG. 2(*a*), but may for example be a pair of associated nodes, one of which may be referred to as a monitoring node ($N_m$) 26*m*, and another of which may referred to as a decapsulation node ($N_d$) 26*d*. The monitoring node ($N_m$) 26*m* may perform the function of identifying whether packets are correctly encapsulated (i.e. in an outer header and with an inner header that includes path characterisation information), and if so, monitoring the path characterisation information in the inner header, while the decapsulation node ($N_d$) 26*d* may perform the function of decapsulating packets that were correctly encapsulated in order to establish their intended destination (i.e. Receiver R), before forwarding the packets on towards that destination. The decapsulation node 26*d* is shown located immediately after the monitoring node 26*m* and before the node 27 in the path, but it may be located beyond a number of further nodes in the path.

An alternative embodiment will now be described in the context of a scenario involving a home user connected to a network via a home gateway, using FIG. 3(*a*), which shows a data path from sending computer (S) 31 to receiving computer (R) 39, traversing various nodes including the home gateway 33 itself, which serves as the network attachment node (Na), and various network nodes 34-37 including a traffic management module (Nm) 36. The home gateway (Na) 33 is in the scope of control of the customer and outside the scope of control of the network provider who may, for example, only control the traffic management module (NM).

The centralised measurement and traffic management function (NM) is used to measure congestion downstream of network attachment node (Na) 33 for each customer. It uses this measurement to police incoming traffic, using, for example, a congestion policing function such as or similar to those described in International application WO 2006/082443, or in the article entitled "*Policing Freedom to Use the Internet Resource Poor*" by A. Jacquet, B. Briscoe & T. Moncaster (Proc Workshop on Re-Architecting the Internet (ReArch'08), ACM, December 2008). In this way, a centralised node may police each customer's traffic based on the contribution to shared congestion from that customer. Shared congestion includes congestion in the access and aggregation network between the customer and the centralised traffic management module (NM) 36, for instance on the DSLAM 34 and BRAS 35 shown in FIG. 3(*a*). Congestion in the customer's own network is deliberately excluded.

In a preparatory step, the network operator again may make it a condition of its service (or a condition of a particular class or level of its service) that it will only forward IP packets if they are encapsulated with an MPLS header addressed to the traffic management module (NM) 36. During network operation the management module (NM) 36 discards arriving MPLS frames that are not addressed to it or which do not encapsulate a valid IP packet. Thus, network attachment node (Na) 33 is configured to encapsulate IP packets destined for any Receiving Computer (R) 39 with an appropriate MPLS shim header destined for the label switched path towards the traffic management module (NM) 36, as it wishes this node (NM) to forward IP packets to Receiving Computer R via core router 37. The DSLAM 34 and BRAS 35 are both arranged to forward incoming MPLS frames.

During operation, the traffic management module (NM) 36 decapsulates the MPLS shim header of arriving frames, but before propagating any path characteristic from the outer MPLS header into the forwarded IP header it records the state of any path characteristic field or fields carried in the inner IP header. As nodes on the path update path metrics in packets, they only alter the outer MPLS header, never the inner IP header, which would otherwise violate the reasoning behind encapsulatign. Therefore the inner IP header effectively preserves the state of the path metrics as they were when the packet was encapsulated by the home gateway (Na) 33. In this way the traffic management module (NM) 36 at the egress of the tunnel can see congestion as it was when the home gateway (Na) 33 encapsulated the packets. Thus, the management module (NM) 36 can measure the congestion experienced by the packet between the sender (S) 31 and the ingress of the tunnel (Na) 33, namely congestion upstream of the home gateway (Pu,a).

The network operator may also make it a condition of service that the source (S) 31 must re-insert congestion markings such as the proposed re-ECN markings (or whatever protocol based on this is eventually standardised) into the forward stream of data packets, using a proposed codepoint in the IP header termed 're-Echo'. Thus any IP node in the network, whether network attachment node (Na) 33 or network management module (NM) 36, can measure congestion along the whole path (Pw) by inspecting passing packets and monitoring the proportion of packets marked with the 're-Echo' codepoint against those without it. The network operator can ensure that the sender carries out this step faithfully using an egress policing mechanism such as or similar to, for example, those described in International application WO 2005/109783 or in the article on Re-ECN discussed earlier.

The management module (NM) 36 can then subtract congestion (Pu,a) upstream of the attachment node (Na) 33 from the whole path congestion (Pw) to calculate the expected path congestion (Pd,a) downstream of the home gateway (Na) 33. Thus the management module 36 can remotely view all three path characteristics as they would be seen from the home gateway 33: upstream (Pu,a), downstream (Pd,a) and the whole path (Pw).

With reference briefly to FIG. 3(b), and as was explained with reference to FIG. 2(b), it should be noted that the traffic management module 36 need not be a single node (NM) 36 as is shown in FIG. 3(a), but may for example be a pair of associated nodes, one of which may referred to as a monitoring node (N$_m$) 36m, and another of which may referred to as a decapsulation node (N$_d$) 36d. The monitoring node (N$_m$) 36m may perform the function of identifying whether packets are correctly encapsulated (i.e. in an outer header and with an inner header that includes path characterisation information), and if so, monitoring the path characterisation information in the inner header, while the decapsulation node (N$_d$) 36d may perform the function of decapsulating packets that were correctly encapsulated in order to establish their intended destination (i.e. Receiver R), before forwarding the packets on towards that destination. The decapsulation node 36d is shown located immediately after the monitoring node 36m and before the core router in the path, but it may be located beyond a number of further nodes in the path.

The invention claimed is:

1. A method of forwarding data units, the method comprising:

receiving, at a traffic management module within a data network, at least one data unit from a remote node outside said data network, said data network being defined by one or more attachment points via which data units are received from one or more remote nodes outside said data network;

in the event that said at least one received data unit is encapsulated in an outer header and that it is identified that path characterisation information indicative of at least one measure of a dynamic network characteristic at a remote node outside said data network has been included in an inner header of said data unit prior to encapsulation, performing the following in respect of said data unit:

monitoring said path characterisation information in said inner header; and forwarding said data unit according to a first treatment category;

and otherwise subjecting said data unit to alternative treatment to being forwarded according to said first treatment category.

2. A method according to claim 1 wherein said forwarding of data units according to said first treatment category comprises forwarding said data units on a path towards an intended data receiver, and wherein said alternative treatment comprises not forwarding said data units on a path towards an intended data receiver.

3. A method according to claim 1 wherein said forwarding of data units according to said first treatment category comprises forwarding said data units without imposing a delay, and wherein said alternative treatment comprises forwarding said data units after imposing a delay.

4. A method according to claim 1 wherein said forwarding of data units according to said first treatment category comprises forwarding said data units without an associated mark and wherein said alternative treatment comprises forwarding said data units with an associated mark.

5. A method according to claim 1, wherein said forwarding of data units according to said first treatment category comprises forwarding said data units on a path towards an intended data receiver, and wherein said alternative treatment comprises forwarding said data units on a different path towards an intended data receiver.

6. A method according to claim 1 wherein said path characterisation information comprises information indicative of an upstream network characteristic, said upstream network characteristic relating to a measure of said network characteristic on a path from a data sender to said remote node.

7. A method according to claim 1 wherein said network characteristic relates to a measure of network congestion.

8. A method according to claim 1 wherein said network characteristic relates to a measure of time spent traversing a path by a data unit or relates to a measure of the number of hops taken to traverse a path by a data unit.

9. A method according to claim 1 wherein at least one header of said at least one data unit provides end-to-end path characterisation information indicative of an end-to-end network characteristic, said end-to-end network characteristic relating to a measure of said network characteristic on a path from a data sender to a data receiver.

10. A method according to claim 1 wherein said method further comprises setting a level of service and/or a class of service to be provided in respect of data units received from a particular remote node in dependence on the path characterisation information obtained in monitoring data units received from said remote node.

11. A method according to claim 1 wherein said method further comprises performing policing and/or sanctioning in respect of data units received from a particular remote node in dependence on path characterisation information obtained in the monitoring of data units received from said remote node.

12. A method according to claim 1 wherein said method further comprises a step of decapsulating data units prior to the forwarding of said data units according to said first treatment category.

13. A method according to claim 12 wherein said traffic management module comprises a monitoring node operable to perform the step of monitoring path characterisation information in the inner headers of data units; and a decapsulation node associated therewith and operable to perform said step of decapsulating said data units.

14. A traffic management module for forwarding data units, the traffic management module being located within a data network defined by one or more attachment points via which data units are received from one or more remote nodes outside said data network the traffic management module comprising:
 a receiver configured to receive at least one data unit from a remote node outside said data network;
 a processor configured to perform the following in respect of said at least one received data unit in the event that said received data unit is encapsulated in an outer header and that it is identified that path characterisation information indicative of at least one measure of a dynamic network characteristic at a remote node outside said data network has been included in an inner header of said data unit prior to encapsulation:
 monitor said path characterisation information in said inner header; and
 forward said data unit according to a first treatment category;
 said processor being configured to subject said data unit otherwise to alternative treatment to being forwarded according to said first treatment category.

15. A traffic management module according to claim 14, wherein said traffic management module comprises a single node.

16. A traffic management module according to claim 14, wherein said traffic management module comprises a plurality of associated nodes.

17. A system for enabling the monitoring, at a location within a data network, of path characterisation information relating to at least a portion of a path from a sender of data to a receiver of data, said path characterisation information being indicative of at least one measure of a dynamic network characteristic at a remote node outside said data network, said data network being defined by one or more attachment points via which data units are received from one or more remote nodes outside said data network, said system comprising:
 the traffic management module according to claim 14 within said data network; and
 at least one intermediate node within said data network and on a path between said remote node outside said data network and said traffic management module, the or each intermediate node being configured to receive data units having an outer encapsulating header and an inner path characterisation header associated therewith, and, in respect of each data unit, to update path characterisation data in the encapsulating header thereof in dependence on a locally-observed measure of said network characteristic while preserving information provided by said path characterisation header, and to forward said data unit in dependence on an intended destination address for said data unit provided by said encapsulating header.

* * * * *